No. 681,549. Patented Aug. 27, 1901.
J. HOLT.
ROLLER BEARING.
(Application filed Mar. 12, 1901.)
(No Model.) 3 Sheets—Sheet 1.
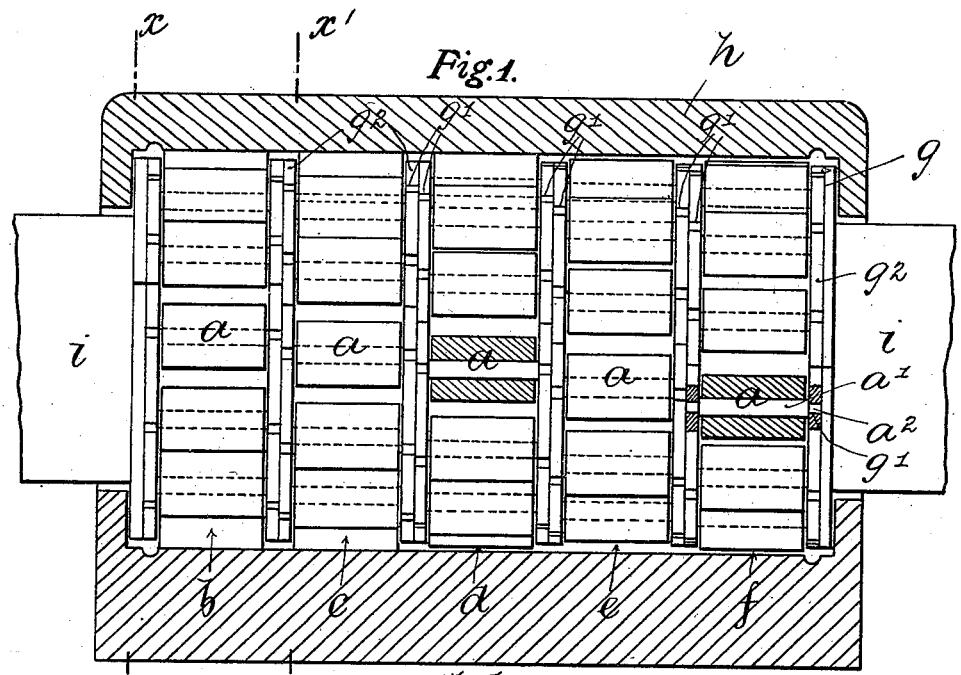
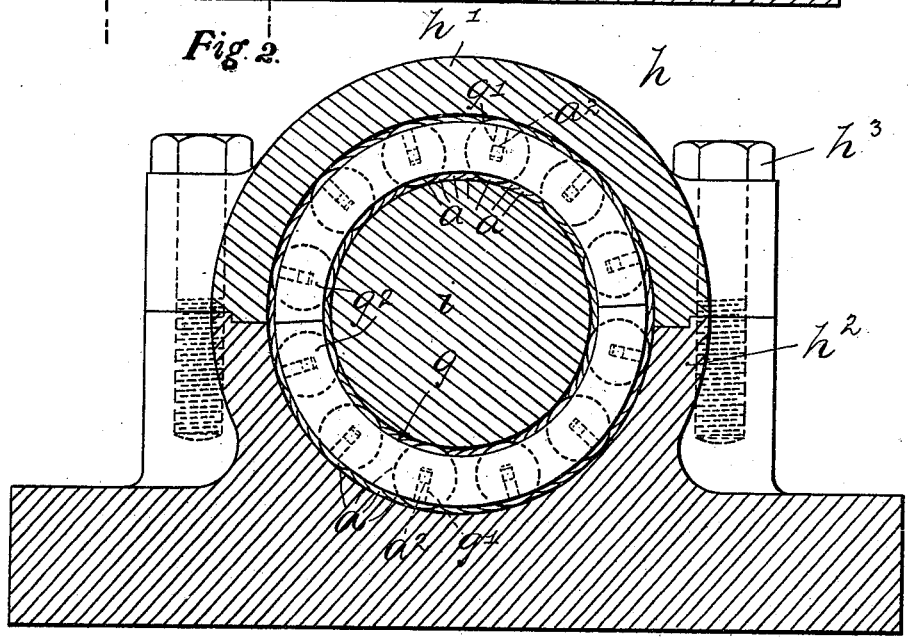
WITNESSES
INVENTOR
John Holt
BY James L. Norris.
ATTY No. 681,549. Patented Aug. 27, 1901.
J. HOLT.
ROLLER BEARING.
(Application filed Mar. 12, 1901.)
(No Model.) 3 Sheets—Sheet 2.
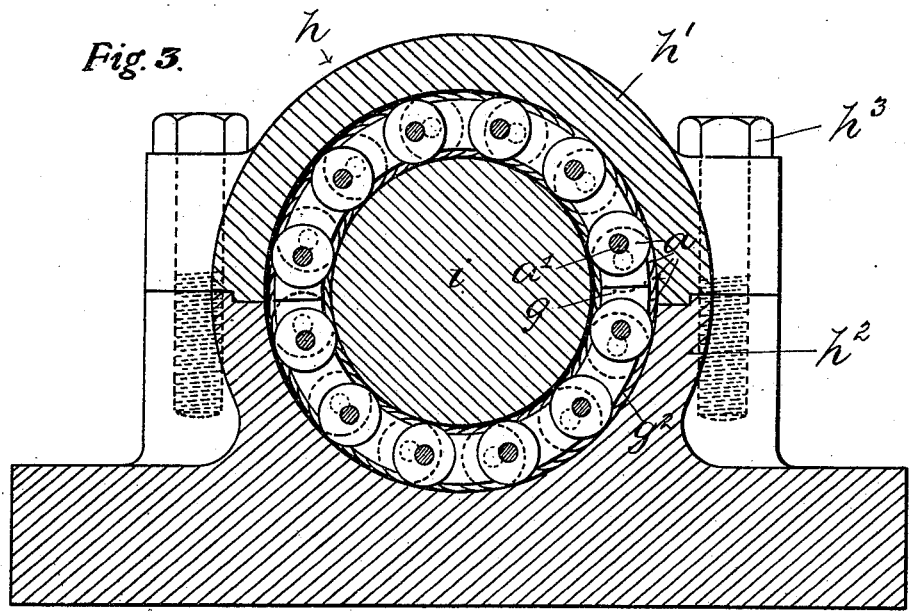
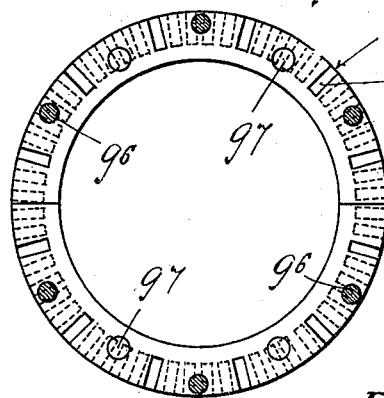
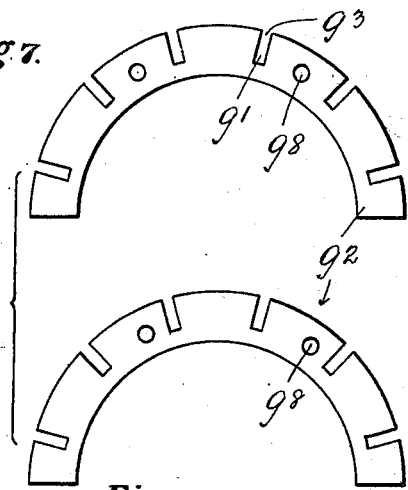
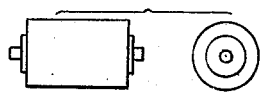
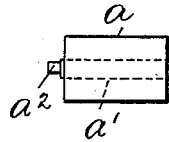
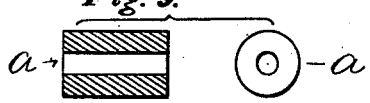
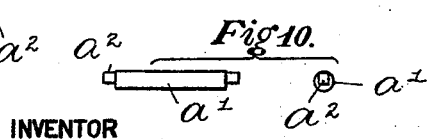
WITNESSES
INVENTOR
John Holt
BY James L. Norris
ATTY
THE NORRIS PETERS CO., PHOTO-LITHO., WASHINGTON, D. C.

No. 681,549. Patented Aug. 27, 1901.
J. HOLT.
ROLLER BEARING.
(Application filed Mar. 12, 1901.)
(No Model.) 3 Sheets—Sheet 3.
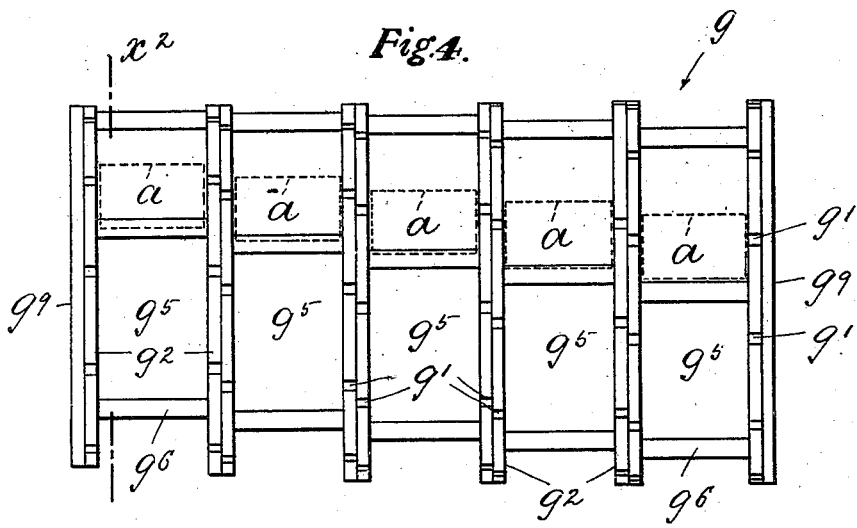
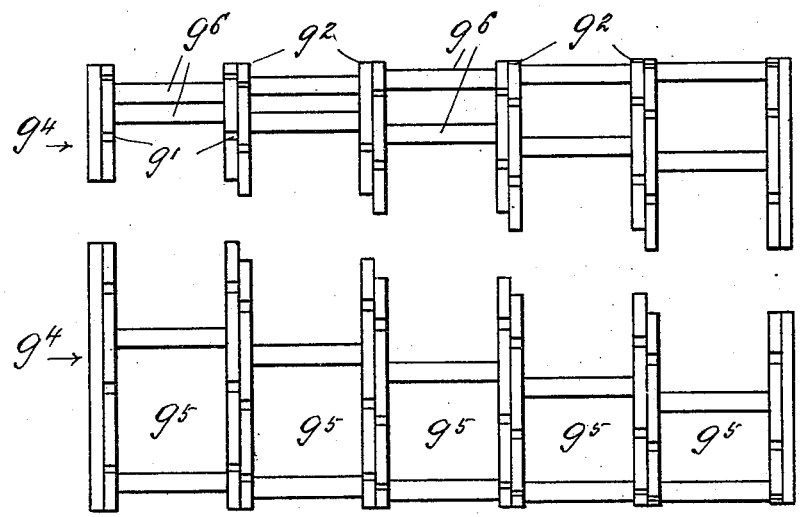
WITNESSES INVENTOR
John Holt
BY James L. Norris
ATTY
THE NORRIS PETERS CO., PHOTO-LITHO., WASHINGTON, D. C.

UNITED STATES PATENT OFFICE.

JOHN HOLT, OF ASTON, ENGLAND.

ROLLER-BEARING.

SPECIFICATION forming part of Letters Patent No. 681,549, dated August 27, 1901.

Application filed March 12, 1901. Serial No. 50,849. (No model.)

*To all whom it may concern:*

Be it known that I, JOHN HOLT, engineer, a subject of the King of Great Britain, residing at 97 Frederick road, Aston, near the city of Birmingham, England, have invented certain new and useful Improvements in Roller-Bearings, of which the following is a specification.

This invention has relation to antifriction-bearings; and the objects and advantages thereof will be hereinafter set forth, and said invention is illustrated in the accompanying drawings, in which—

Figure 1 represents a roller-bearing for a rotating shaft constructed and arranged in accordance with my invention. In this view the casing of the bearing is drawn in longitudinal vertical section, so as to clearly show the disposition and arrangement of the rollers in their cage and their bearing or rolling contacts. Fig. 2 is a transverse vertical section of Fig. 1 upon the dotted line $x$. Fig. 3 represents another transverse vertical section of Fig. 1 upon the dotted line $x'$. Fig. 4 is an elevation of the sectional cage within which the rollers of the bearing are mounted, the stepped or helical positions of the said rollers being indicated in this view by the dotted lines. Fig. 5 is another elevation of the said cage, showing the two sections of the same separated. Fig. 6 is a transverse vertical section of the said cage upon the dotted line $x^2$, Fig. 4. Fig. 7 represents a separate elevation of two frame-segments of one of the half-sections of the cage. Fig. 8 is an elevation of one of the rollers and its spindle. Fig. 9 shows a longitudinal section and an end view of the said roller separately, while Fig. 10 represents an elevation and an end view of the spindle separately. Fig. 11 represents a modified form of roller having its trunnion ends formed in one with itself.

The same letters of reference indicate corresponding parts in the several figures of the drawings.

The bearing represented in the drawings is fitted with five annular series of antifriction-rollers, respectively marked $b$, $c$, $d$, $e$, and $f$, mounted in a loose cage $g$, inclosed between the fixed casing or plumber-block $h$ and the running shaft $i$, and the component rollers $a$ of each series being arranged as above described, so that the lines of peripheral contact between the series of rollers and the shaft (or their bearing-surfaces) are stepped both longitudinally or in the axial direction of the said shaft and also helically, as represented in Fig. 1 and shown diagrammatically by the dotted lines in Fig. 4. By disposing the rollers in accordance with this system the shaft is efficiently supported and sustained circumferentially at all frictional points and crushing of the rollers is obviated, while the tendency of the said rollers to get wedged under the pressure of the load at any point of its circumference is prevented, thereby greatly reducing friction in use. Each of the rollers $a$ is independently mounted out of contact with the contiguous rollers of the same series upon a fixed non-rotating spindle $a'$, whose opposite ends $a^2$ slide and fit within radial slots or gaps $g'$, formed in the rings $g^2$ of the cage-frame $g$, with their open ends $g^3$ coming upon the outer edges of the said rings to admit of the introduction of the roller-spindles in position. The ends of the said spindles are free to slide radially within the said slots, which admits of the several rollers readily adjusting themselves to their proper working positions in rolling contact with the outer periphery of the shaft and the inside of the fixed casing, respectively, while they are firmly held in position circumferentially. The cage-frame $g$ is made in two longitudinal sections $g^4$ $g^4$ (see Fig. 5) to admit of it being fitted to or removed from the shaft, and the casing $h$ is also (for the same purpose) made in two parts $h'$ $h^2$, secured together by bolts $h^3$ or other suitable means. The two sections of the said cage comprise a number of compartments $g^5$, respectively, constituting the carriers for the annular series of rollers $b$, $c$, $d$, $e$, and $f$ and each comprising a pair of transversely split or divided rings $g^2$, slotted, as before described, for the reception of the ends of the roller-spindles and connected to one another longitudinally by fixed tie-bars $g^6$, while the contiguous frame-rings of each compartment are preferably secured together by rivets $g^7$, passed through the coincident holes $g^8$, the two outermost rings being fastened to end rings $g^9$.

To facilitate manufacture, I propose to make each of the component half-rings of the cage-compartments a counterpart of the others— that is to say, each of the segments has the same number of equidistant slots $g'$ radiating inward from its outer edge, as shown in Fig. 7, which represents two such half-sections separately, and the slots of any two segments would (before the several parts are assembled) register if placed side by side; but in order to insure the stepping of the rollers I so connect the several semicircular segments comprising the halves of the cage that the slots in the edges of the segments forming the compartment of the roller series $c$ are set, pitched, or stepped slightly forward of or out of line with the gaps in the sides of the compartment containing the roller series $b$, while the gaps in the segments of the series $d$ are set forward the same distance from the gaps of the series $c$, and so on throughout the length of the bearing, so that the dividing-lines separating the two halves of the frame are stepped or graduating, as shown in Fig. 5, and correspond to the stepped lines of peripheral or helical contact of the rollers with the shaft and confining-casing, respectively.

The connection of the contiguous pairs of counterpart segments forming the adjacent sides of the successive annular compartments is preferably effected by pitching or setting forward the rivet-holes in each successive pair of segments in advance of the holes of the preceding pair to an extent equal to the stepping of the rollers.

It is obvious that instead of mounting the rollers to rotate around fixed spindles, as above described, the rollers may be provided with pivot or trunnion ends which are capable of both rotating and sliding within the radial slots in the compartment sides, as represented in Fig. 11, or they may be confined or caged individually within separate housings arranged in annular series. The improvements are also applicable to bearings of the type in which both the shaft and casing members are rotating elements or in which the casing or box element rotates around the stationary shaft.

Having fully described my invention, what I desire to claim and secure by Letters Patent is—

1. In a roller-bearing, a cage consisting of a plurality of annular portions certain of which are fastened directly to each other and tie-bars connecting the remaining annular portions.

2. In a roller-bearing, a cage consisting of a plurality of annular portions certain of which are fastened directly to each other and tie-bars connecting the remaining sections and said annular portions consisting of a series of segments.

3. In a roller-bearing, a cage consisting of a plurality of annular portions certain of which are fastened directly to each other and tie-bars connecting the remaining annular portions and said annular portions having radial slots open at the outer ends.

4. In a roller-bearing, a cage consisting of a plurality of annular portions certain of which are fastened directly to each other and tie-bars connecting the remaining annular portions and said annular portions having radial slots open at the outer ends, and end rings fastened to the end annular portions.

In testimony whereof I have hereunto set my hand in presence of two subscribing witnesses.

JOHN HOLT.

Witnesses:
HY SKERRETT,
ARTHUR T. SADLER.